United States Patent

[11] 3,603,626

[72] Inventor Roger B. Whiteside
  Cinnaminson, Burlington, N.J.
[21] Appl. No. 794,123
[22] Filed Jan. 27, 1969
[45] Patented Sept. 7, 1971
[73] Assignee Standard Pressed Steel Co.
  Jenkintown, Pa.

[54] HIGH-STRENGTH JOINT AND FASTENER ASSEMBLY THEREFOR
  4 Claims, 3 Drawing Figs.

[52] U.S. Cl................................................287/189.36, 85/85
[51] Int. Cl......................................... F16b 5/00
[50] Field of Search........................................ 287/189.36
  F, 20.92 E, 127, 110, 111, 52.06, 52.04, DIG. 9;
  285/321, 373, 417; 85/8.3, 84, 85

[56] References Cited
UNITED STATES PATENTS

| | | | |
|---|---|---|---|
| 591,193 | 10/1897 | Osgood | 277/220 X |
| 1,323,192 | 11/1919 | Kottusch | 277/220 |
| 2,604,974 | 7/1952 | Daigle | 287/111 UX |
| 2,972,275 | 2/1961 | Baubles | 85/8.3 |
| 3,099,470 | 7/1963 | Zumbusch | 287/127 |
| 3,270,410 | 9/1966 | Salter et al. | 287/189.36 F X |
| 3,298,725 | 1/1967 | Boteler | 287/189.36 F |

FOREIGN PATENTS

| 1,452,293 | 8/1966 | France | 85/8.3 |

Primary Examiner—David J. Williamowsky
Assistant Examiner—Wayne L. Shedd
Attorneys—Stanley Belsky and Curtis, Morris and Safford ABSTRACT: A high-strength joint and fastener assembly therefor wherein an internally tapered sleeve is placed within substantially aligned bores in mating structural members and a tapered bolt is inserted through the members and into the internally tapered sleeve. A threaded fastener member, such as nut, is threaded on the end of the tapered bolt and is tightened to place a load on the joint thereby radially expanding the tapered sleeve outwardly within each of the bores in the structural members to compensate for variations in the holes due to out of roundness of the holes, misalignment between holes in each structural member, or variations in hole diameter tolerances.

PATENTED SEP 7 1971 3,603,626

INVENTOR.
ROGER B. WHITESIDE

BY Curtis, Morris & Safford
ATTORNEYS

HIGH-STRENGTH JOINT AND FASTENER ASSEMBLY THEREFOR

This invention relates to high-strength joints and more particularly to high-strength joints and fastener assemblies therefor wherein a fastener is adapted to pass through aligned openings in the structural members to be joined to tightly clamp the members together.

In precision fastening applications, i.e., in aircraft, missile and space applications, wherein it is necessary to form a joint of two or more structural members, such as sheets or plates of metal, it is essential that the joint be formed with maximum structural integrity to yield the highest tensile and shear strength characteristics which can be obtained from the materials employed. Most commonly, such joints consist of two or more structural members placed in abutting face-to-face relationship with each of the members having substantially aligned bores therein and a headed fastener member, such as a bolt or rivet, is placed therethrough and suitably engaged on its other end to apply a compressive load to the structural members thereby to tightly clamp the members together.

Ideally, the bolt should fit in the bores of the structural members as tightly as possible such that when the compressive load is applied to the fastening member, the walls of the bores containing the fastening member are actually stressed. In fact, the greatest possible strength in such joints, is achieved when the fastener member engages the wall of the bores in the structural members throughout the entire periphery of the bolt and throughout the full length of the bolt. Practically, results of this type are difficult to achieve as it is necessary to maintain critically high tolerance limits for bore sizes in the structural members, degree of roundness of the bores, surface finish of the walls of the bore as well as critical tolerance requirements for the diameter of the bolt, surface finish of the periphery of the bolt and the like. To compound the already difficult task of achieving the tolerance ranges noted above, it is also necessary to insure precise alignment of the bores in mating structural members in order to create, in effect, a unitary constant dimension bore when the structural members are placed in abutting face-to-face relationship.

Maintenance of such critical tolerances is prohibitive with all the variable factors that must be considered both from a cost factor and from the time and effort involved in trying to drill, bore and ream holes to the tolerances required as well as machining bolts and rivets to the same precise tolerances.

It is, therefore, an object of the present invention to provide a joint and fastener assembly therefor to withstand the maximum possible stress limits inherent for the particular materials employed.

It is a further object of the present invention to provide a joint and fastener assembly therefor utilizing the maximum practical bearing surface of the interior wall surface of the bores in the structural members to be joined.

It is also an object of the present invention to provide a joint and fastener assembly therefor which reduces stress concentration and fatigue in the structural members to be joined by imparting a uniform radial stress to the walls of the bores in the structural members.

Another object of the present invention is to provide a high-strength joint and fastener assembly therefor without requiring or necessitating costly manufacturing procedures.

In a preferred embodiment of the present invention, a tapered fastener member such as a bolt is used within a tapered sleeve which is placed within substantially aligned bores in mating structural members. The sleeve includes a scarfed step joint thereby to facilitate radially outward expansion of the sleeve as the bolt is loaded, for example by tightening a nut thereon. The scarfed step joint in the tapered sleeve assures uniform radial expansion of the sleeve in the receiving bores thereby to fill the bores in the structural members and apply a uniform radial stress along the internal wall periphery.

Additional and further objects and advantages will become readily apparent when considered with the following description with reference to the accompanying drawings wherein.

Figure 1:
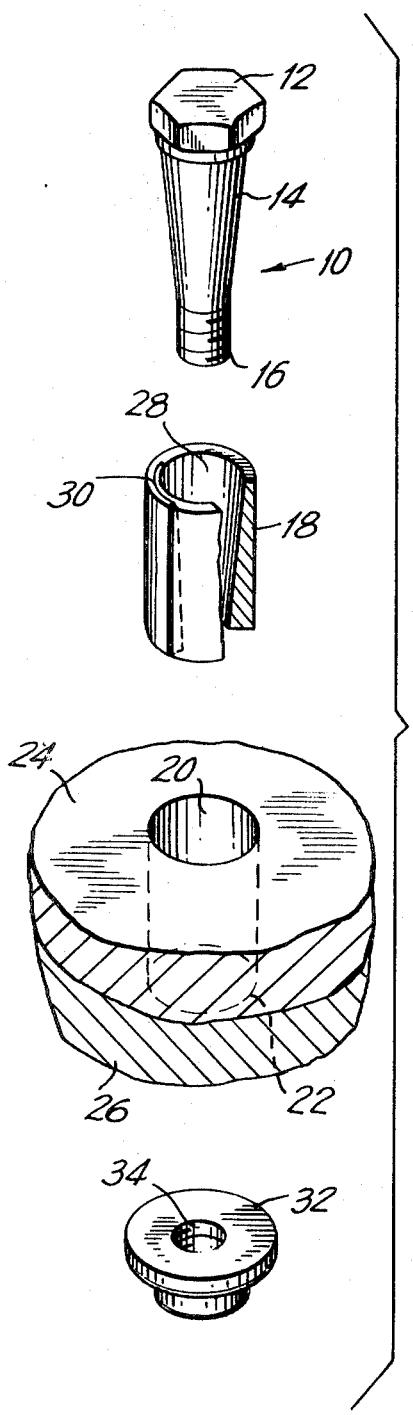
FIG. 1 is an exploded perspective view showing the tapered bolt, tapered sleeve, structural members to be joined and a nut.
Figure 2:
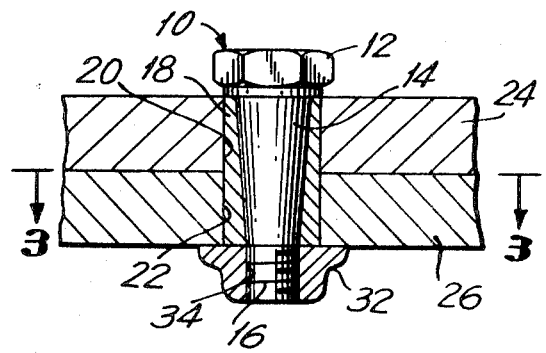
FIG. 2 is a vertical sectional view showing an assembled joint.
Figure 3:
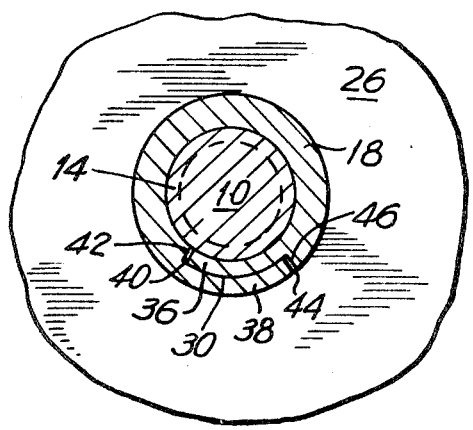

FIG. 3 is a horizontal sectional view taken on line 3—3 of FIG. 2. With reference to the drawings and particularly FIG. 1, there is shown a bolt 10 having a driving head 12, which may be of any standard configuration but is shown here illustratively as a hexagonal-shaped head, a tapered shank portion 14 and a standard threaded end portion 16. A sleeve 18 having a cylindrical exterior surface is adapted to be placed within substantially aligned bores 20 and 22 of structural members 24 and 26, respectively. Sleeve 18 includes an internally tapered surface 28 which is complimentary to the taper on the tapered shank portion 14 of bolt 10. Sleeve 18 also includes a longitudinally disposed scarfed step joint 30 which permits the sleeve 18 to expand radially outwardly after it is placed within the bores 20 and 22. A threaded fastener member such as a nut 32, which can be of any standard nut configuration, having an internally threaded surface 34 to receive and coact with an externally threaded surface 16 of bolt 10 completes the assembly.

As best seen in FIG. 2, the completed joint includes the abutting structural members 24 and 26 with their respective bores 20 and 22 being substantially coaxially aligned. Internally tapered sleeve 18 is placed therein and the bolt 10 is placed within sleeve 18 with the tapered shank portion 14 positioned within tapered portion 28. The nut 32 is then threaded on the end 16 of bolt 10 and tightened to place an axially compressive load which clamps structural members 24 and 26 together.

As best seen in FIG. 3, the scarfed step joint 30 includes arcuate abutting finger extensions 36 and 38 with each finger extension having approximately one-half the thickness of sleeve 18. Finger 36 has an end portion 40 which, before any load is placed on sleeve 18, abuts shoulder portion 42 formed by the extension of finger 38 from the main sleeve portion. Similarly, finger 38 includes an end portion 44 which initially abuts a shoulder portion 46 formed by the extension of finger 36 from the main sleeve portion.

As noted above, sleeve 18 initially has a substantially cylindrical exterior periphery due to the closely nesting relationship of the fingers 36 and 38 and is selected for a particular application so that the outer diameter of the sleeve provides a sliding fit within bores 20 and 22. The particular shape of the scarfed step joint 30 permits a radial expansion of the sleeve 18 when the bolt 10 moves axially within the sleeve as the nut 32 is tightened thereon. Axial movement of bolt 10 imparts a radially outward force vector uniformly throughout the tapered interior surface 28 of the sleeve which expands the sleeve to completely fill bores 20 and 22. Since the degree of radial expansion is not of a great magnitude, the sleeve 18 may be constructed from relatively hard material having a somewhat limited ductility and, because the material of the sleeve is hard, the ultimate stress rating of the joint is greatly increased. The expansion of sleeve 18 is also effective when the bores 20 and 22 are slightly misaligned as the sleeve ductility permits a nonuniform expansion in each bore.

Prior art attempts to provide joints of this type have used tapered bolts and tapered sleeves but have relied on a softer sleeve material of greater ductility to permit sufficient radial expansion of the sleeve. Thus, the sleeve material used in these devices must be softer and more ductile to achieve the same degree of peripheral load bearing surface within the bores of the structural members. Other devices have used axial, closed end slots within the sleeve and these slots are relatively costly to machine and result in significantly less peripheral load bearing surface in contact with the internal wall surface of the bores thereby resulting in reduced joint integrity. Additionally, the slots must be stretched in order to expand the sleeve radially outwardly which results in portions of the sleeve being of nonuniform thickness and, hence, causing a nonuniform variation in load stress concentrations in the joint.

The sleeve of the present invention can be readily manufactured in a flat stock condition and then rolled to form an exterior cylindrical sleeve surface thereby simplifying manufacture and reducing costs. Additionally, the completed cylindrical sleeve can be hardened and plated after it has been rolled.

It is thus seen that the present invention provides a tapered sleeve which can be radially expanded outwardly within aligned bores of two or more abutting structural members thereby to increase and maximize the peripheral bearing surface of the joint while stressing the internal wall surface in the structural members to maximize the strength of the joint.

What is claimed is:

1. In a high-strength joint comprising at least two structural members with substantially aligned bores therein, a sleeve of relatively hard material having a limited ductility, said sleeve having a cylindrical exterior surface and a tapered internal surface and extending throughout the length of said aligned bores, a bolt having a driving head and a shank, said shank including a tapered segment having a taper complimentary to said sleeve internal taper and a threaded end portion, a threaded fastener member adapted to coact with said bolt threaded end portion, the improvement wherein:

said sleeve includes a single longitudinally disposed expandable joint extending throughout the longitudinal extent of said sleeve to allow said sleeve to expand radially outwardly within the confines of said aligned bores in said structural members when said joint is loaded thereby to impart a uniform stress to the wall surfaces defining said bores, said expandable joint comprising a scarfed step joint wherein a potion of said sleeve overlaps another portion of said sleeve in face-to-face abutting relationship.

2. In a high-strength joint comprising at least two structural members with substantially aligned bores therein, a sleeve having a cylindrical exterior surface and a tapered internal surface within said aligned bores, a bolt having a driving head and a shank, said shank including a tapered segment having a taper complimentary to said sleeve internal taper and a threaded end portion, a threaded fastener member adapted to coact with said bolt threaded end portion, the improvement wherein:

said sleeve includes a single longitudinally disposed expandable joint to allow said sleeve to expand radially outwardly within the confines of said aligned bores in said structural members when said joint is loaded thereby to impart a uniform stress to the wall surfaces defining said bores, said expandable joint comprising a scarfed step joint wherein a portion of said sleeve overlaps another portion of said sleeve in face-to-face abutting relationship, said overlapping portions of said joint comprising arcuate finger extensions of said sleeve, each said extension being of the order of one-half the thickness of the sleeve and having a radius of curvature coincident with the radius of curvature of said sleeve at that point.

3. A fastener assembly for a high-strength joint comprising a bolt having a driving head, a shank threaded at its end, said shank including a tapered midportion having a generally frustoconical configuration with the wider end adjacent said driving head and the narrower end adjacent said threaded end, an internally threaded nut adapted to engage and coact with said threaded end, and a sleeve member of relatively hard material having a limited ductility, said sleeve having a generally cylindrical exterior and a frustoconical internal surface complimentary to the frustoconical portion of said bolt shank, said sleeve extending longitudinally throughout the frustoconical portion of said bolt shank and further including a longitudinally disposed expandable joint extending throughout the longitudinal extent of said sleeve thereby to permit a uniform radially outward expansion of said sleeve when said nut is progressively engaged on said bolt while said bolt is positioned within said sleeve, said expandable joint comprising overlapped arcuate extensions of the wall of said sleeve.

4. A fastener assembly for a high-strength joint comprising a blot having a driving head, a shank threaded at its end, said shank including a tapered midportion having a generally frustoconical configuration with the wider end adjacent said driving head and the narrower end adjacent said threaded end, an internally threaded nut adapted to engage and coact with said threaded end, and a sleeve member having a generally cylindrical exterior and a frustoconical internal surface complimentary to the frustoconical portion of said bolt shank, said sleeve further including a single longitudinally disposed expandable joint thereby to permit a uniform radially outward expansion of said sleeve when said nut is progressively engaged on said bolt while said bolt is positioned within said sleeve, said expandable joint comprising overlapped arcuate extensions of the wall of said sleeve, each said arcuate extension having a thickness approximately equal to one-half the wall width of the sleeve.